Feb. 27, 1962 C. HARTSHORN 3,022,892
APPARATUS FOR MEASURING AND CLASSIFYING WOMEN'S STOCKINGS
Filed Jan. 28, 1960 3 Sheets-Sheet 1

Inventor
CYRIL HARTSHORN
By *Imirie & Smiley*
Attorneys

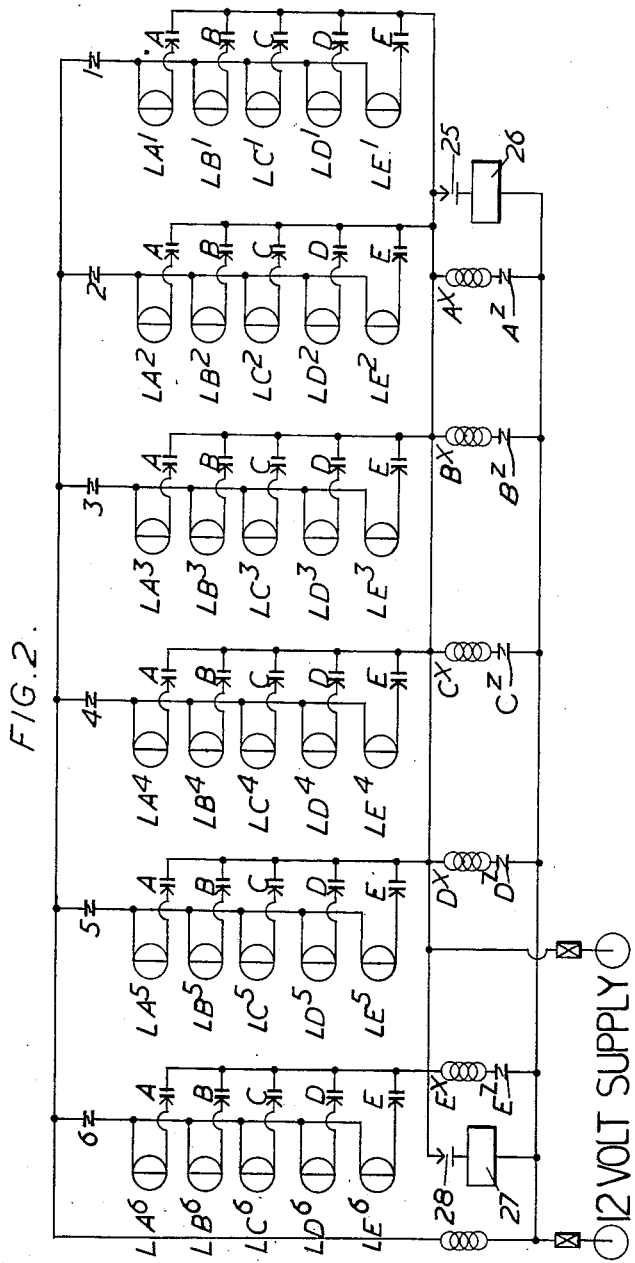

Feb. 27, 1962 C. HARTSHORN 3,022,892
APPARATUS FOR MEASURING AND CLASSIFYING WOMEN'S STOCKINGS
Filed Jan. 28, 1960 3 Sheets-Sheet 3
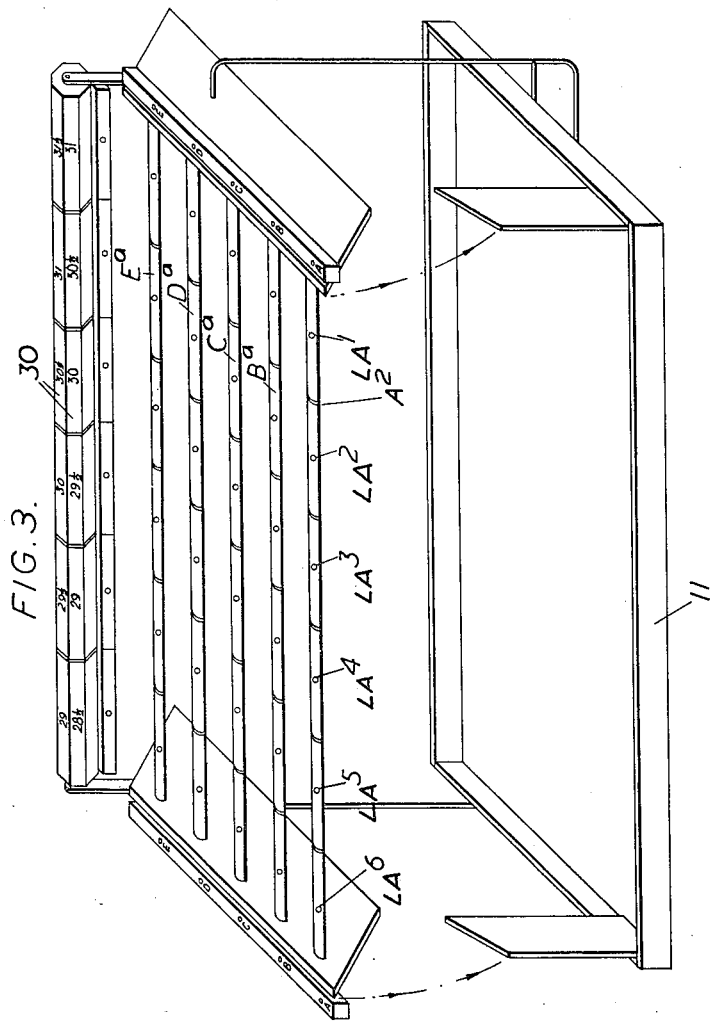
Inventor
CYRIL HARTSHORN
By *Imirie + Smiley*
Attorneys United States Patent Office 3,022,892
Patented Feb. 27, 1962

3,022,892
APPARATUS FOR MEASURING AND CLASSIFYING WOMEN'S STOCKINGS
Cyril Hartshorn, 64 Ray St., Heanor, England
Filed Jan. 28, 1960, Ser. No. 5,139
Claims priority, application Great Britain Feb. 2, 1959
11 Claims. (Cl. 209—122)

This invention relates to apparatus for measuring and classifying women's stockings, so that they can be sorted out and graded to provide identical stockings for pairing.

In women's stockings of any given size of foot, there are two other features which should be matched in order to provide a pair, namely the length of the heel splice, commonly called the cuban, and the length of the leg. To provide a matched pair of stockings it is necessary that the length of the cuban and the length of the leg shall be the same within fairly close limits.

The usual method of matching pairs of stockings as generally practised at the present time is to lay the stockings on a table and place one upon another so that they can be compared visually. Possibly a considerable number have to be laid out in this way before a fresh stocking on being examined is found to make a pair with one of those already laid out. The matched pair is then taken away. This is a slow and tedious method and is very wasteful in the time of the worker. Another method consists in measuring the leg lengths, sorting out the stockings into batches, each batch confined to stockings of a given leg length, and then further sorting out each batch into different lengths of cuban. All this has to be done separately for each different foot size in the range manufactured.

The object of this invention is to provide an apparatus by which the work of classifying stockings and sorting them out into batches of identical stockings both as to length of cuban and length of leg can be greatly speeded up and the chances of mistakes greatly reduced.

According to the present invention a measuring table is provided having a location for the heels of stockings, a series of press-buttons representing different measurements of the length of heel splice situated near to the location, and a further series of press buttons situated approximately a leg-length away from the first series and representing different measurements of the length of leg, the measuring table having associated with it a series of supports upon which stockings can be placed, each support being provided with an indicator lamp, means being provided in electrical connection with the press buttons and the lamps whereby operation of any two press buttons comprising one of the heel splice buttons and one of the leg length buttons will act to light an indicator lamp on one of the supports, each indicator lamp corresponding therefore to a different combination of heel-splice and leg length measurements and enabling stockings having each different combination of measurements to be placed on the appropriate support.

Referring to the accompanying drawings:

FIGURE 2 is a diagram illustrating a typical electrical lay-out.

FIGURE 3 is a similar view to FIGURE 1 showing another form of the invention.

Figure 1:
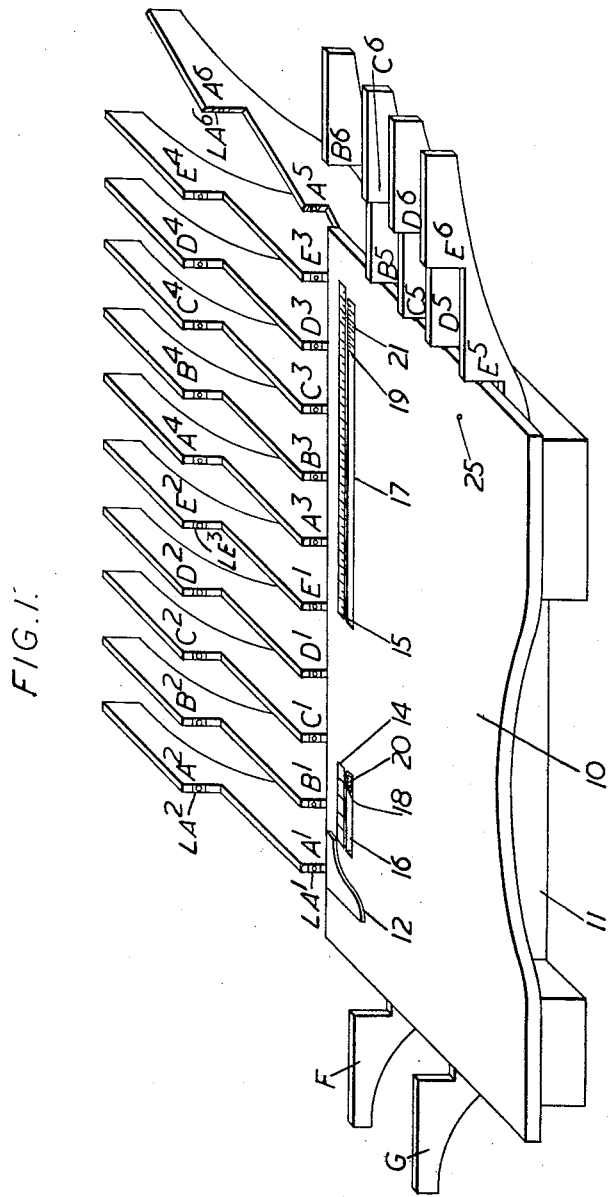
FIGURE 1 is a perspective view of a measuring table and associated stocking supports in one form of the invention.

Referring to FIGURE 1 a table 10 is mounted on the top of a suitable supporting frame or tray 11. On the table top near one end there is an upstanding curved location 12 shaped to correspond with the curvature of a stocking heel, so that a succession of stockings can be placed on the table, with their heels fitting close up to the location and their legs drawn out straight along the table towards the other end, and all the stockings will be identically positioned in relation to the measuring devices to be described.

These measuring devices consist of two separate measuring scales, one 14 fairly close to the location 12, and another 15 a leg length away. Alongside each measuring scale the table top has an opening 16, 17 respectively, which receives an adjustable block, 18, 19 respectively, the block being held in the opening in a slidable manner so that it can be moved along to register with any desired portion of the associated measuring scale. For instance the blocks may be locked at the desired positions by screws engaging with their lower surfaces.

Each block 18, 19 carries a series of upstanding press-button switches or contact members of any suitable type, 20, 21 respectively as indicated in FIGURE 1 generally on the table top. As shown there are five press-buttons on the block 18, corresponding to heel-splice lengths, and six press-buttons on the block 19 corresponding to leg lengths, but this is purely by way of example as any suitable numbers may be provided to suit the different requirements of individual manufacturers. The table has secured to its supporting frame a number of supports over which stockings can be hung, each support consisting of an arm having two separate locations for stockings, the forwardly facing end of each location being fitted with an indicator lamp indicated generally in this figure by the letter L prefixed to the arm location reference, $A^1$, $A^2$, etc.

Referring to FIGURE 2, the five heel-splice switches are here individually indicated as $A^z$, $B^z$, $C^z$ $D^z$ and $E^z$, and the six leg length switches are individually indicated as 1, 2, 3, 4, 5 and 6. Therefore on FIGURE 1 the stocking locations on the different arms are each denoted by a combination of one of the five letters A, B, C, D or E and one of the six numerals 1, 2, 3, 4, 5 or 6 and in FIGURE 2 the corresponding lamps have the same designations prefixed by the letter L. Each of the switches A, B, C, D and E has associated with it a solenoid, marked in FIGURE 2 as $A^x$, $B^x$, $C^x$, $D^x$ and $E^x$. Supposing that one of the heel splice press buttons is depressed its associated switch is closed and current energises the solenoid associated with that particular switch, say for example the switch is $A^z$ and the solenoid is therefore $A^x$. This action causes all the contacts marked A to close and connects one pole of all the indicator lamps marked LA to one pole of the circuit. In other words all the LA lamps are now capable of being lighted, but the action will not take place until the particular LA lamp is selected by means of pressure on one of the leg length press buttons. Thus if the leg length button 1 is pressed, the lamp $LA^1$ on the stocking support marked $A^1$ in FIGURE 1 will light up, if the leg length button 2 is pressed the support $LA^2$ will be indicated by the lighting of its lamp, and it will be seen that there is a support for each different heel-splice and leg-length combination, thirty different combinations in the example illustrated. Each support may have an indication of leg length measurement so that the person who takes off the accumulated stockings from time to time can see which leg length each particular support carries. The leg lengths may need to be specified on the packaging, but the actual heel splice length is not usually important so long as the pair are matched. It will be understood that all stockings being measured at a time will have the same foot size, and so it is possible to set the heel splice and leg length switch blocks 18, 19 to register with that part of the scale of measurements which is appropriate to that foot size. However instead of adjusting the position of the blocks as described it would be equally possible to have a complete range of switch press buttons for the whole scale of measurements, and to provide a control device for bringing any desired group of these into the circuitry corresponding to the foot size being measured. It would be inconvenient to provide a sufficient number of different supports for the whole possible range of measurements. In either case, the operator having set the machine to suit the foot size to be dealt with, the procedure is that each stocking is laid on the table with its heel close up to the location 12. It is held in this position with the left hand of the operator who then presses the appropriate heel splice button which registers with the top of the heel splice, normally using the thumb or first finger of the left hand for the purpose. Meanwhile the welt of the stocking is being held in the right hand, the stocking being laid out flat, and the operator presses the leg length button nearest to the top of the welt of the stocking. This selects a lamp which accordingly glows, and the operator notes which particular lamp is lighted, and places the stocking upon the support denoted by that lamp, as can be seen by comparing FIGURES 1 and 2 where the supports or locations on the arms in FIGURE 1 and the corresponding lamps in FIGURE 2 have the same references.

Two spare locations are shown at F and G in FIGURE 1 for over-length and under-length stockings but these are not connected up to the indicator circuits. A switch button 25 on the right of FIGURE 1 may be provided and used to operate an electric counter 26 FIGURE 2, to indicate the number of these over-length and under-length stockings.

If it is desired to provide a count of the number of stockings passed for pairing another counter 27, FIGURE 2 may be provided, operated by a switch 28 which is automatically actuated each time an indicator lamp is lighted.

It will be understood that the electrical components will normally be mounted on the underside of the table 10 or in the tray 11.

FIGURE 3 shows a different form of location or support for the stockings in the form of a rack comprising translucent tubular bars with lamps inside them. As shown there are five bars marked respectively $A^a$, $B^a$, $C^a$, $D^a$ and $E^a$, and the lamps have been marked $LA^1$, $LA^2$, $LA^3$, $LA^4$, $LA^5$ and $LA^6$ along the front bar A, to facilitate comparison with the lay-outs of FIGURES 1 and 2. In this arrangement the leg lengths could conveniently be indicated on a fixed rail 30 at the back which may also have indicator lights on each of its six sections. This rack arrangement is preferably pivotally mounted at the back and normally inclines downwards towards the front, but it is capable of being raised hingedly as indicated in FIGURE 3 for ease in lifting off the stockings. The electrical arrangements may be similar to those already described. The table 10 is here omitted for the sake of simplicity in illustration but is identical in every respect, including the switch arrangements, with the table shown in FIGURE 1 except that its dimension from front to back would be kept to a minimum and the rack structure here depicted would be immediately behind the table.

Any other form of supports or locations for the stockings may be used, however, so long as each one incorporates an indicator lamp to show where each individual stocking must be placed after measuring.

In some cases it might be desired to take more than two measurements, for instance to measure welt lengths as well as heel splice and leg lengths, in which case it would be quite easy to provide a third group of press button switches at the appropriate position. Alternatively, if it were desired to measure welts instead of heel splices the position of the heel splice press-button switches may be moved accordingly.

I claim:

1. Apparatus for measuring and classifying women's stockings in which a table is provided with two sets of measuring devices, one positioned for heel-splice lengths and the other for leg lengths, a series of electrical switches associated with each measuring device one switch for each measurement offering a number of alternative switch combinations to correspond with each possible combination of measurements, and a number of stocking supports each having an indicator lamp, each available switch combination being operatively associated with a different lamp and denoting therefore a different measurement combination.

2. Apparatus for measuring and classifying women's stockings comprising a measuring table, a location on the table for the heels of stockings, a series of pressbuttons representing different measurements of the length of heel splice situated near to the location, and a further series of press buttons situated approximately a leg-length away from the first series and representing different measurements of the length of leg, the measuring table having associated with it a series of supports upon which stockings can be placed, each support being provided with an indicator lamp, means being provided in electrical connection with the press buttons and the lamps whereby operation of any two press buttons comprising one of the heel splice buttons and one of the leg length buttons will act to light an indicator lamp on one of the supports, each indicator lamp corresponding therefore to a different combination of heel-splice and leg-length measurements and enabling stockings having each different combination of measurements to be placed on the appropriate support.

3. Apparatus as claimed in claim 2 in which said supports associated with the table are in the form of a number of arms extending from the table and having one of said indicator lamps on each arm.

4. Apparatus as claimed in claim 3 in which each arm has two separate locations for stockings each with a forwardly facing end fitted with an indicator lamp.

5. Apparatus as claimed in claim 2 in which said supports associated with the table comprise a number of translucent bars each bar having a number of indicator lamps in it at intervals, the bars forming supports for stockings and the lamps indicating different parts of each bar corresponding to the different measurement combinations.

6. Apparatus as claimed in claim 2 in which the heel-splice switches and the leg-length switches are each mounted on a separate block which is adjustably mounted in relation to a measurement scale on the table.

7. Apparatus as claimed in claim 2 having further supports for receiving stockings whose dimensions are outside the desired range of measurements.

8. Apparatus for classifying articles according to at least two measurements, comprising a table, at least two groups of switches mounted on said table, each group being positioned to correspond with a particular feature of the articles, and the switches in each group being positioned to correspond with predetermined dimensions of the particular feature, a number of electrically operated indicator lamps connected with the switches, the number of lamps being the product of the numbers of switches in the groups, each lamp being operable only by the actuation of one particular switch in each group and each possible combination of switches therefore operating a different lamp, a number of supports for the articles being classified, the number of supports being the same as the number of lamps, and one support being physically disposed in association with each lamp.

9. Apparatus according to claim 8 having a location on the table positioned in relation to the groups of switches so as to serve for correctly positioning the articles preparatory to measuring.

10. Apparatus according to claim 8 having two groups of switches, one positioned for measuring heel-splice length in stockings and the other positioned for measuring leg-length in stockings, and a location on the table for stocking heels by which the stockings can be correctly positioned preparatory to measuring.

11. Apparatus according to claim 8 having openings in the table and a block adjustably mounted in each opening, each group of switches being mounted on one of the blocks, so that the range of measurements to be taken by each group can be altered by adjusting the position of the blocks.

References Cited in the file of this patent

UNITED STATES PATENTS 2,902,152    Wilkes _____ Sept. 1, 1959

FOREIGN PATENTS 776,553    Great Britain _____ June 12, 1957